United States Patent
Zhang et al.

(10) Patent No.: US 9,959,307 B2
(45) Date of Patent: May 1, 2018

(54) AUTOMATIC QUESTION SORTING

(71) Applicant: Empire Technology Development LLC, Wilmington, DE (US)

(72) Inventors: Dehai Zhang, Yunnan (CN); Jun Fang, Shaanxi (CN); Degang Zhang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 441 days.

(21) Appl. No.: 14/431,490

(22) PCT Filed: Sep. 24, 2013

(86) PCT No.: PCT/CN2013/084041
§ 371 (c)(1),
(2) Date: Mar. 26, 2015

(87) PCT Pub. No.: WO2015/042766
PCT Pub. Date: Apr. 2, 2015

(65) Prior Publication Data
US 2016/0048545 A1    Feb. 18, 2016

(51) Int. Cl.
*G06F 17/30* (2006.01)
(52) U.S. Cl.
CPC .. *G06F 17/30345* (2013.01); *G06F 17/30705* (2013.01); *G06F 17/30876* (2013.01)
(58) Field of Classification Search
CPC .............................................. G06F 17/30345
See application file for complete search history.

(56) References Cited

U.S. PATENT DOCUMENTS

| | | | |
|---|---|---|---|
| 2003/0034999 A1* | 2/2003 | Coughlin, III | G09B 7/00 715/738 |
| 2008/0120101 A1 | 5/2008 | Johnson et al. | |
| 2010/0235164 A1 | 9/2010 | Todhunter et al. | |
| 2014/0244398 A1* | 8/2014 | Wasilewski | G06Q 30/0269 705/14.66 |

FOREIGN PATENT DOCUMENTS

| | | |
|---|---|---|
| CN | 101251862 A | 8/2008 |
| CN | 101320374 A | 12/2008 |
| WO | 2012116414 A1 | 9/2012 |

OTHER PUBLICATIONS

Mocanu, Semantic Clustering of Questions. 2007, <https://aimas.cs.pub.ro/amicity/doc/CatalinaMocanu-SemanticQuestionClustering-document.pdf>.*
Paranjpe, Clustering Semantically Similar and Related Questions. 2012, <https://nlp.stanford.edu/courses/cs224n/2007/fp/paranjpe.pdf>.*
Heiner et al., Improving Student Question Classification. 2009, <https://www.researchgate.net/publication/221570427_Improving_Student_Question_Classification?>.*

(Continued)

*Primary Examiner* — Syed H Hasan

(57) ABSTRACT

In a large presentation or lecture, multiple questions submitted by the audience may be classified into one or more common questions based on the semantic relatedness of the submitted questions. Further, the common questions may be sorted and presented to a host or lecturer so that the host or lecturer may efficiently answer the common questions.

19 Claims, 4 Drawing Sheets

(56) References Cited

OTHER PUBLICATIONS

"Audience response," accessed at http://web.archive.org/web/20131024083558/http://en.wikipedia.org/wiki/Audience_response, last modified on Oct. 18, 2013, pp. 1-14.

"Interactive tools to collect audience feedback at conferences," accessed at http://web.archive.org/web/20130818120000/http://michaelheipel.wordpress.com/2011/03/17/interactive-tools-to-collect-audience-feedback-at-conferences/, posted on Mar. 17, 2011, pp. 1-5.

Hirst, G., and St-Onge, D., "Lexical chains as representations of context for the detection and correction of malapropisms," WordNet: An electronic lexical database, MIT Press, pp. 43, (Dec. 28, 1995).

International Search Report and written opinion for PCT application No. PCT/CN2013/084041 dated Jun. 23, 2014.

Jaggavarapu, B.S.R., "Interactivity Support for Ex-Cathedra Teaching," Conference ICL2009, Villach, Austria (Sep. 23-25, 2009).

Jiang, J.J., and Conrath, D.W., "Semantic similarity based on corpus statistics and lexical taxonomy," in Proceedings on International Conference on Research in Computational Linguistics, Taiwan, pp. 19-33 (Aug. 1997).

Lesk, M., "Automatic sense disambiguation using machine readable dictionaries: how to tell a pine cone from an ice cream cone," in Proceedings of the 5th annual international conference on Systems documentation, ACM Press, pp. 24-26 (Jun. 1986).

Lin, D., "Using syntactic dependency as local context to resolve word sense ambiguity," in Proceedings of the 35th Annual Meeting of the Association for Computational Linguistics, pp. 64-71 (Jul. 1997).

Lopez, V., et al., "Merging and Ranking Answers in the Semantic Web: The Wisdom of Crowds," The Semantic Web, vol. 5926, pp. 135-152 (Jun. 2009).

Patwardhan, S., and Pedersen, T., "Using WordNet-based context vectors to estimate the semantic relatedness of concepts," In: Proceedings of the EACL 2006 workshop, making sense of sense: Bringing computational linguistics and psycholinguistics together, Trento, Italy, pp. 2-3 (Apr. 2006).

\* cited by examiner

AUTOMATIC QUESTION SORTING

CROSS-REFERENCE TO RELATED APPLICATION

This Application is a U.S. National Stage filing under 35 U.S.C. § 371 of International Application No. PCT/CN13/84041, filed on Sep. 24, 2013.

TECHNICAL FIELD

The technologies described herein pertain generally to filtering feedback and questions corresponding to a lecture, conference, presentation, or other collaborative environment.

BACKGROUND

Unless otherwise indicated herein, the approaches described in this section are not prior art to the claims in this application and are not admitted to be prior art by inclusion in this section.

In a large presentation or lecture, a lecturer may seek an efficient process by which pertinent questions and/or feedback may be received from the participants, which may be challenging particularly with the large number of participants. For example, the lecturer may prefer to select those questions submitted first so that the most interested participants may have the opportunity to have their questions answered.

SUMMARY

Technologies are generally described for automatic question collecting, classifying, and sorting. The various techniques described herein may be implemented in various devices, methods and/or systems.

In some examples, various embodiments may be implemented as methods. Some methods may include electronically receiving multiple questions in response to a presentation; recognizing one or more common questions, each of which represents a subset of the multiple questions that bear a substantial similarity, based on a semantic relatedness value between each of the one or more common questions; and sorting the common questions based on one or more parameters of each of the common questions.

In some examples, various embodiments may be implemented as systems. Some systems may include a question organizer configured to electronically receive multiple questions in response to a presentation; a classifier configured to recognize one or more common questions, each of which represents a subset of the multiple questions that bear a substantial similarity, based on a semantic relatedness value between each of the one or more common questions; a calculator configured to calculate one or more parameters for each of the common questions; a sorter configured to sort the common questions based on the one or more parameters; and a publisher configured to publish a question list that includes the common questions.

In some examples, various embodiments may be implemented as computer-readable mediums having executable instructions stored thereon. Some computer-readable mediums may store instructions that, when executed, cause one or more processors to perform operations comprising electronically receiving multiple questions in response to a presentation from one or more computing devices; recognizing one or more common questions, each of which represents a subset of the multiple questions that bear a substantial similarity; receiving a new question; calculating a semantic relatedness value between the new question and each of the one or more common questions; determining whether at least one of the semantic relatedness values reaches a predetermined threshold value; including the new question to a corresponding one of the one or more common questions if one of the semantic relatedness value is equal to or greater than the predetermined threshold value; identifying the new question as a new common question if none of the semantic relatedness value is equal to or greater than the predetermined threshold value; sorting the common questions based on one or more parameters, which include at least one of a popularity value, a time of submission, a general semantic relatedness value between each of the common questions and a general topic, or a length of each of the common questions, of each of the common questions; and publishing a common question list that includes the one or more common questions and the one or more parameters respectively corresponding to each of the one or more common questions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
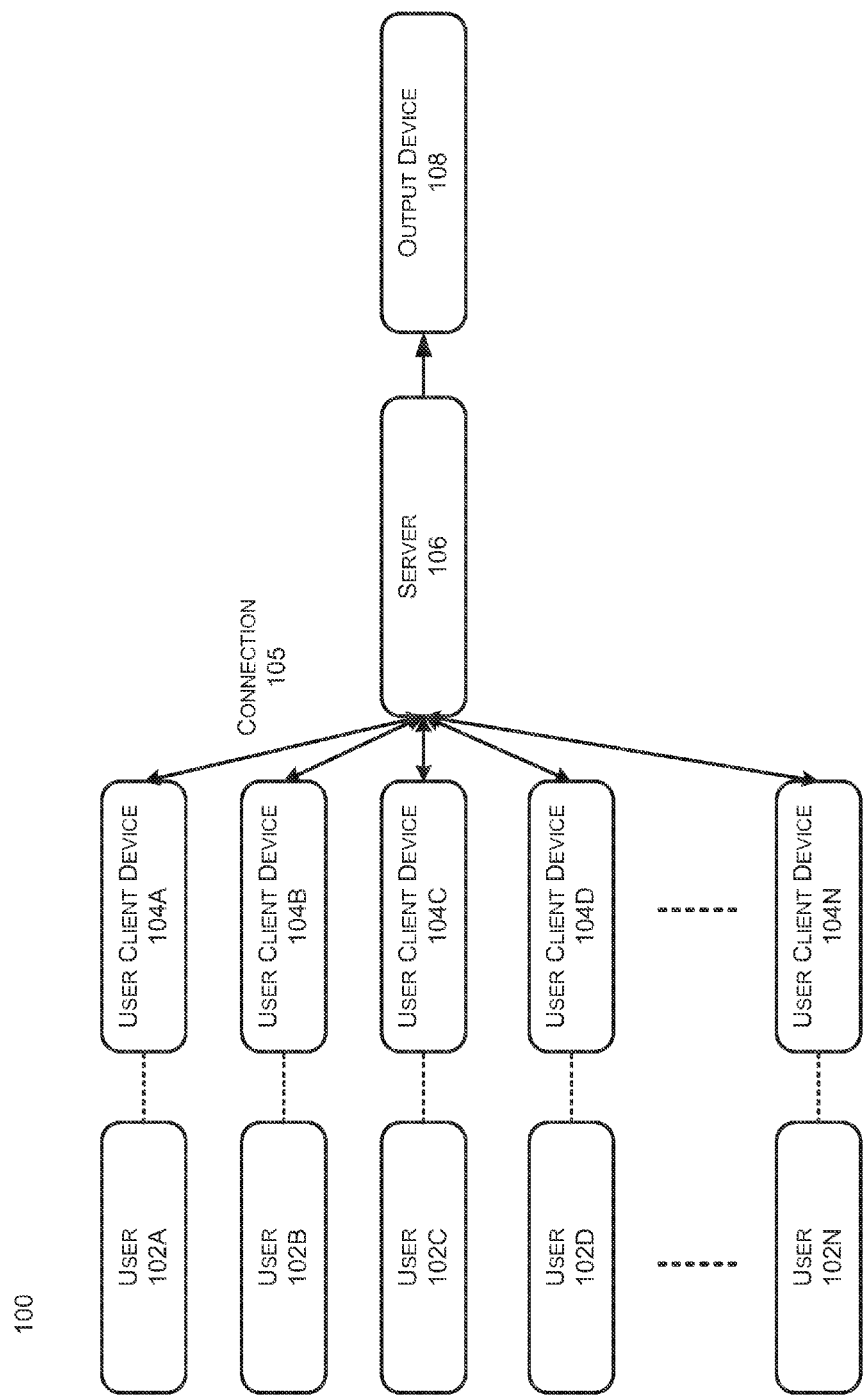
FIG. 1 shows an example system in which automatic question sorting may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which automatic question sorting may be implemented, arranged in accordance with at least some embodiments described herein. As depicted, example system 100 may include, at least, one or more users 102A-102N; one or more user client devices 104A-104N; a server 106 that is communicatively coupled, via a connection 105, to user client devices 104A-104N; and an output device 108.

Users 102A-102N may refer to one or more participants of a group activity that may include, e.g., a conference, a lecture, or a presentation. The group activity may be hosted by one or more hosts or given by one or more presenters or lecturers, interchangeably referred to herein as lecturers. The number of users 102 may be more than the number of hosts or lecturers and is in no way limited in quantity to the depiction in FIG. 1. Unless context requires specific reference to one or more of users 102A-102N, collective reference may be made to "users 102."

User client devices 104A-104N may refer to one or more communication devices that may be communicatively coupled to server 106, and each of such devices may be utilized by a respective one of users 102 to submit questions, comments, inquiries, etc., during or in the course of the group activity. Non-limiting examples of such user client devices may include personal computers, wireless communication devices, laptops, tablets, personal digital assistants (PDA), etc. User client devices 104 may be configured to receive inputs of the questions and, further, transmit the received questions to server 106 via connection 105. Unless context requires specific reference to one or more of user client devices 104A-104N, collective reference may be made to "user client devices 104."

Connection 105 may refer to one or more communication links between a respective one of user client devices 104 and server 106, and each of such links may adhere to at least one of multiple available communication protocols to support communication between user client devices 104 and server 106. Non-limiting examples of the communication protocols may include one or more of mobile communications technologies, e.g., Global System for Mobile Communications (GSM), Code Division Multiple Access (CDMA), etc., depending upon the technologies supported by particular wireless service providers. The one or more communication links may be implemented utilizing non-cellular technologies such as conventional analog AM or FM radio, Wi-Fi™, wireless local area network (WLAN or IEEE 802.11), WiMAX™ (Worldwide Interoperability for Microwave Access), Bluetooth™, hard-wired connections, e.g., cable, phone lines, and other analog and digital wireless voice and data transmission technologies.

Server 106 may refer to a computing device that is configured to receive the feedback and/or questions from user client devices 104 and, further, to sort the received questions in accordance with the embodiments described herein. Typically, in a large scale group activity, such as a lecture or conference, one or more of users 102 may submit questions that bear a substantial similarity to one another. The host or lecturer may efficiently select and answer the questions submitted from users 102 if the similarly posed questions are grouped together and, therefore, addressed just once. Thus, in some examples, server 106 may be configured to calculate a semantic relatedness value between received questions to thereby recognize and/or identify the similarly posed questions. The similarly posed questions may be referred to as common questions. A received question may be disregarded if a respective semantic relatedness value reaches a predetermined threshold value; otherwise, the received question may be identified as a new common question if none of the semantic relatedness values is equal to or greater than the predetermined threshold value. The threshold value may be predetermined by a system administrator, the one or more hosts, the one or more lecturers, presenters, etc., based on data received from a series of previous applications of the automatic question sorting method and/or system.

For example, in a lecture regarding food safety, questions such as "is milk imported from Australia safe?" and "does milk from Australia contain unhealthy substances?" may be grouped together if the semantic relatedness value therebetween is higher than a predetermined threshold value, and may be submitted to a speaker or moderator for addressing as a singular question, e.g., "is Australian milk safe?" Further to the example, a received question such as "is milk from Australia safe?" may be disregarded if server 106 determines the relevance of the question and the topic-at-hand, i.e., the semantic relatedness value, has reached the predetermined threshold value. Another question such as "is beef from Britain safe?" may be identified as a new common question if none of the semantic relatedness values is equal to or greater than the predetermined threshold value.

Further, server 106 may be configured to sort the common questions based on one or more parameters thereof. The parameters of the respective common questions may include a popularity value, a time of submission, a general semantic relatedness value between each of the common questions and a general topic, or a length of each common question. As referenced above, a general semantic relatedness value may refer to the relevance between a question and the general topic of the group activity. For example, the general semantic relatedness value of a question such as "how to cook beef?" in a lecture regarding politics may be determined as low. The popularity value may be determined by counting the number of users that submitted a question similar to the common question. Thus, the host or lecturer may select and answer the questions that are first submitted, that are most popular, or most relevant. A list of sorted common questions may be transmitted by server 106 to output device 108.

Output device 108 may refer to a physical device capable of presenting the list of sorted common questions to the lecture and/or users 102. It should be noted that, if there are no common questions submitted, output device 108 may output some or all of the received question individually. Non-limiting examples of output device 108 may include a projector, a printer, a tablet, a desktop computer, a mobile phone, etc. In some example, the projector may be configured to present the list of sorted common question by projecting an image that includes the list of sorted common questions and/or corresponding answers, onto a surface, e.g., a projection screen. The host or lecturer may then answer the sorted common questions when presenting the list to users 102. In some other examples, the printer may be configured to produce a representation of the list of sorted common questions on physical media, e.g., paper. The printed list of sorted common questions may then be delivered to users 102 after the group activity.

Thus, example system 100 may include multiple users 102 utilizing respective user client devices 104 to submit questions to server 106, which may further be configured to a list of questions to output device 108.

Figure 2:
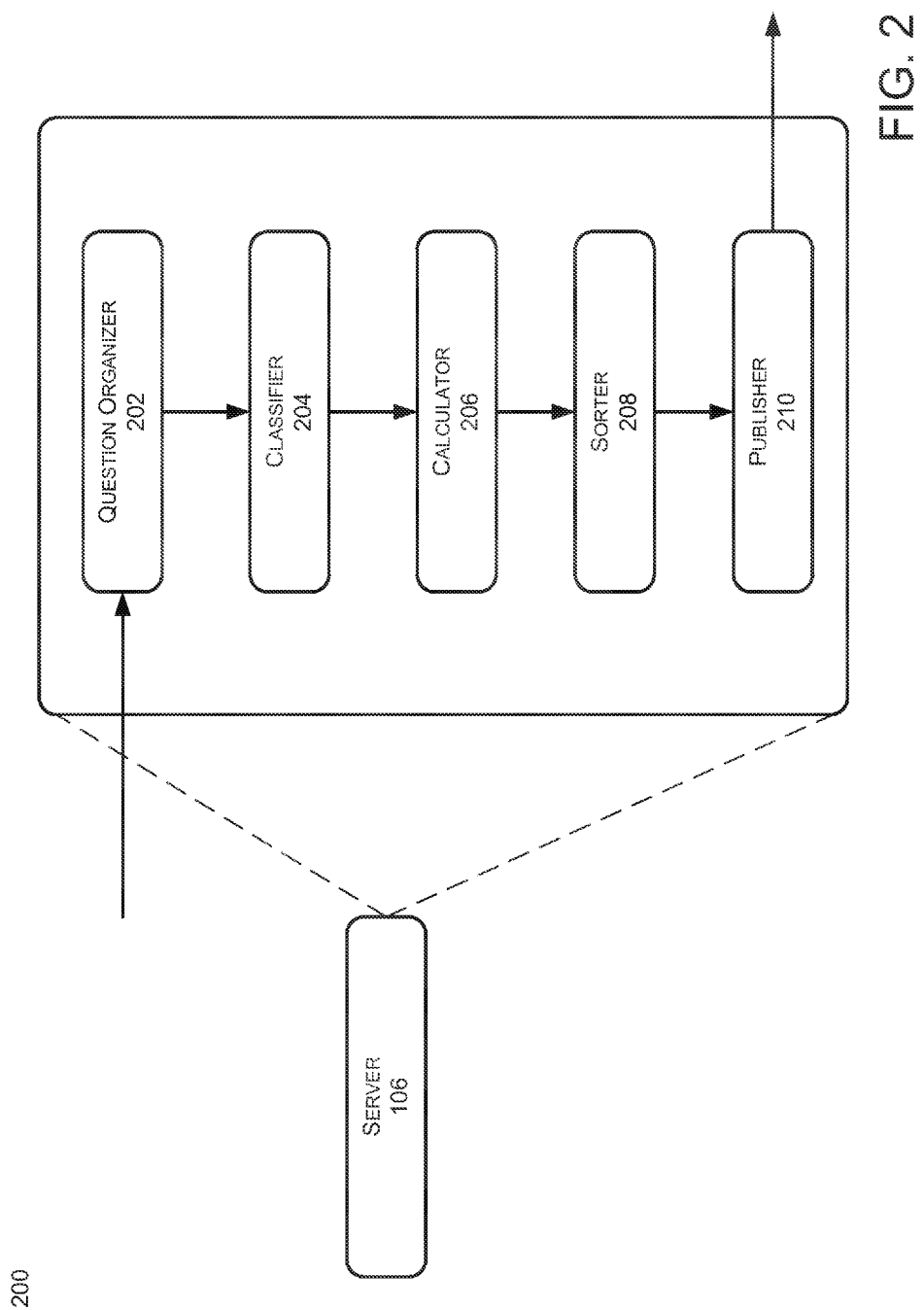
FIG. 2 shows an example configuration of a server by which automatic question sorting may be implemented.

FIG. 2 shows an example configuration 200 of server 106 by which automatic question sorting may be implemented, arranged in accordance with at least some embodiments described herein. As depicted, example configuration 200 may include, at least, a question organizer 202, a classifier 204, a calculator 206, a sorter 208, and a publisher 210.

Question organizer 202 may refer to a software module or component, hosted on server 106, which may be configured to receive or receive the feedback or questions from users 102 via connection 105. The received questions may be stored on one or more hardware storage components, e.g., memories and/or hard drives, of server 106, and, further, may be provided or transmitted to classifier 204. In some examples, users 102 may login, via a user interface provided by question organizer 202, and submit the questions via the user interface. During the login process, question organizer 202 may be configured to require personal information of the respective ones of users 102, e.g., contact information.

Classifier 204 may refer to a software module or component, hosted on server 106, which may be configured to recognize one or more common questions, each of which may represent a subset of the multiple questions that bear a substantial similarity to each other, based on a semantic relatedness value between each of the one or more common questions and each of the multiple questions. The semantic relatedness value may be determined by a semantic analysis based on multiple internet based search results.

In some examples, to recognize or identify the one or more common questions, classifier 204 may be configured to randomly select one of the received questions as the first one of the common questions, and calculate a semantic relatedness value between one of the remainder, i.e., unselected, of the received questions and the first common question. Further, classifier 204 may be configured to determine whether the calculated semantic relatedness value reaches a predetermined threshold value. If the calculated semantic relatedness value is equal to or greater than the predetermined threshold value, the respective question may be disregarded, by classifier 204. If the calculated semantic relatedness value for a respective one of the remaining questions is less than the predetermined threshold value, the respective question may be identified as a new common question. The above-mentioned calculating process may be performed with respect to each of the received questions until all of the received questions are classified appropriately.

In calculating the semantic relatedness value, classifier 204 may be configured to pretreat a received question. A received question may include any question received from user 102 by question organizer 202. Pretreating the respective received questions may include converting words in the question into a case-insensitive form; and/or deleting articles, prepositions, and/or conjunctions. Classifier 204 may be configured to further extract a set of key terms from the respective pretreated questions, to extract a set of common terms from the common questions, and to calculate the semantic relatedness value between the set of key terms and each set of common terms. The set of key terms extracted from a received question $q_i$ may be referred to as $t_s$. The set of common terms from each of the common questions, $Q_i$, may be referred to as $t_{si}=\{t_{s1}, t_{s2}, \ldots\}$. In at least one example, a function to calculate the semantic relatedness value between the set of key terms and the set of common terms of each common question may be represented as $$semRel(t_s, Q_i) = \frac{rel(t_s, t_{si})}{|Q_i|}, t_{si} \in Q_i.$$

In calculating the value of $rel(t_s, t_{si})$, classifier 204 may be configured to calculate a statistic based semantic relatedness between each of the set of key terms and each of the set of common terms; to calculate a content based semantic relatedness, corresponding to the statistic based semantic relatedness, between each of the set of key terms and each of the set of common terms; to assign an adjustable weight factor to each one of the statistic based semantic relatedness and the content based semantic relatedness; and calculate the semantic relatedness value based on the statistic based semantic relatedness, the content based semantic relatedness, and the adjustable weight factor.

In calculating the statistic based semantic relatedness between a first term (e.g., a term selected from the set of key terms) and a second term (e.g., a term selected from the set of common terms), classifier 204 may be configured to first conduct a first internet based search on the first term and to retrieve a first set of search results with respect to the first term. Classifier 204 may then be configured to conduct a second internet based search on the second term and, similarly, to retrieve a second set of search results with respect to the second term. Further, classifier 204 may be configured to conduct a third internet based search on a combination of the first term and the second term and to retrieve a third set of search results. The statistic based semantic relatedness may then be calculated based on the respective counts of the first set of search results, the second set of search results, and the third set of search results. In at least one example, the statistic based semantic relatedness of a first term, $w_1$, and a second term, $w_2$, may be represented as $rel_{statistical}(w_1, w_2)=hits(w_1+w_2)/min(hits(w_1), hits(w_2))$, wherein $hits(w_1+w_2)$ represents the count of the third set of search results and $min(hits(w_1), hits(w_2))$ represents the less one of the counts of the first set of search results and the second set of search results. Accordingly, the statistic based semantic relatedness may range from 0 to 1 and the first term is more related to the second term if the statistic based semantic relatedness is closer to 1.

In calculating the content based semantic relatedness between the first term and the second term, classifier 204 may be configured to generate a content vector respectively for the first term and the second term based on a predetermined number of webpages respectively selected from the first set and the second set of search results, and calculate a cosine similarity, as the content based semantic relatedness, between the respective content vectors of the first term and the second term. That is, classifier 204 may be configured to, first, select a predetermined number, e.g., N, of webpages from top of the respective set of search results of the first term $w_1$ and the second term $w_2$. Each of the two sets of webpages includes multiple words that may be relevant to the first term $w_1$ and the second term $w_2$. Classifier 204 may then be configured to case fold, i.e., convert words into a case-insensitive form, and/or stem, i.e., delete articles, prepositions, and/or conjunctions, the webpages and combine the words therein into two word sequences. Classifier 204 may further be configured to count the number of distinctive words in each word sequences, e.g., $n_1$ and $n_2$, and generate a content vector for each of the word sequence respectively, e.g., $V_1=(v_0, v_1, \ldots, v_{n_1-1})$ and $V_2=(v_0, v_1, \ldots, v_{n_2-1})$. Each element of the respective content vector may correspond to a distinctive word and may be initiated as zero.

Further, classifier 204 may be configured to locate the first term $w_1$ and the second term $w_2$ in each of the word sequence respectively. With respect to each of the located terms, classifier 204 may be configured to identify multiple words within a predetermined distance, e.g., three words from the located term, of the located term and may add 1 to the element corresponding to a respective one of the received multiple words. Thus, a respective content vector may represent the frequency of each one of multiple distinctive words appears within the predetermined distance of a respective term. The content based semantic relatedness may then be calculated, by classifier 204, as the cosine similarity between $V_1$ and $V_2$, which may be represented as $$rel_{content}(w_1, w_2) = \frac{V_1 \cdot V_2}{(|V_1| \cdot |V_2|)}.$$

The semantic relatedness value between the first term $w_1$ and the second term $w_2$ may then be calculated, by classifier 204, based on the statistic based semantic relatedness and the content based semantic relatedness and may be represented as $rel_{search} = \alpha \cdot rel_{content} \, (1-\alpha) \cdot rel_{statistical}$, wherein α represents the adjustable weight factor assigned by classifier 204. Further, the semantic relatedness value between the above-identified set of common terms and the above identified set of key terms, e.g., $rel(t_s, t_{si})$, may be calculated as an average value of the semantic relatedness values between each one of the common terms and each one of the key terms.

Calculator 206 may refer to a software module or component hosted on server 106, which may be configured to calculate the one or more parameters for each of the common questions. As mentioned above, the one or more parameters may include a popularity value, a time of submission, a general semantic relatedness value between each of the common questions and a general topic, or a length of each common question.

Sorter 208 may refer to a software module or component hosted on server 106, which may be configured to sort the common questions based on the one or more parameters. In at least one example, sorter 208 may be configured to sort the common questions based on a general semantic relatedness value between each of the common questions and a general topic of the group activity, e.g., a lecture. The general semantic relatedness value may indicate the relevance between a question and the general topic of the group activity. The host or lecturer may then select those questions that are most relevant to answer first.

Publisher 210 may refer to a software module or component hosted on server 106, which may be configured to publish the question list that includes the common questions. If there are no common questions identified, publisher 210 may be configured to publish each question individually. In some examples, the question list may be transmitted to output device 108.

Thus, example configuration 200 may include at least, question organizer 202 to receive multiple questions, classifier 204 to recognize one or more common questions, calculator 206 to calculate one or more parameters for each of the common question, sort 208 to sort the common questions based on the parameters, and publisher 210 to transmit a list of the common questions to output device 108.

Figure 3:
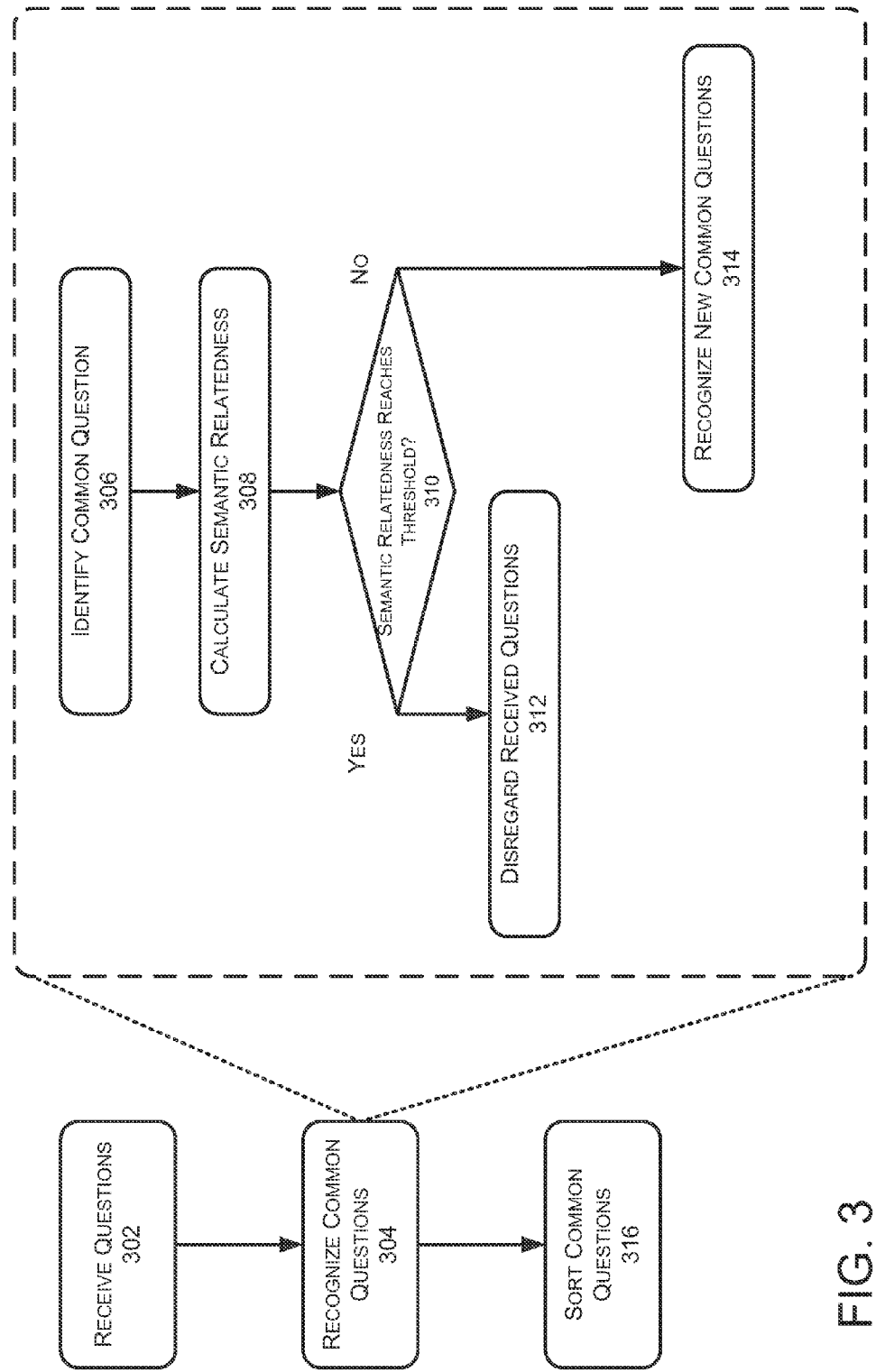
FIG. 3 shows an example configuration of a processing flow of operations by which automatic question sorting may be implemented.

FIG. 3 shows an example configuration 300 of a processing flow of operations by which automatic question sorting may be implemented, arranged in accordance with at least some embodiments described herein. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, 312, 314, and/or 316. Processing may begin at block 302.

Block 302 (Receive Questions) may refer to question organizer 202 receiving one or more questions from users 102 via connection 105. In some examples, users 102 may login to a user interface provided by question organizer 202 and submit the questions via the user interface. During the login process, question organizer 202 may be configured to require personal information of the respective ones of users 102, e.g., contact information. Block 302 may be followed by block 304.

Block 304 (Recognize Common Questions) may refer to classifier 204 recognizing one or more common questions, each of which represents a subset of the multiple questions that bear a substantial similarity, based on a semantic relatedness value between each of the one or more common questions and each of the multiple questions. Block 304 may further include a sub-processing indicated by block 306, 308, 310, 312, and 314.

Block 306 (Identify Common Question) may refer to classifier 204 identifying one or more recognized common questions. In some examples, to identify the first common question, classifier 204 may be configured to randomly select one from the received questions as the first one of the common questions. Block 306 may be followed by block 308.

Block 308 (Calculate Semantic Relatedness) may refer to classifier 204 calculating a semantic relatedness value between a received question (or an unselected question) and each of the identified common questions. That is, classifier 204 may be configured to pretreat a received question, to extract a set of key terms from the respective pretreated questions, to extract a set of common terms from each of the common questions, and to calculate the semantic relatedness value between the set of key terms and each set of common terms. The set of key terms extracted from a received question $q_i$ may be referred to as $t_s$. The set of common terms from each of the common question, $Q_i$, may be referred to as $t_{si} = \{t_{s1}, t_{s2}, \ldots\}$. In at least one example, a function to calculate the semantic relatedness value between the set of key terms and the set of common terms of each common question may be represented as $$semRel(t_s, Q_i) = \frac{rel(t_s, t_{si})}{|Q_i|}, t_{si} \in Q_i.$$

Further, in calculating the value of $rel(t_s, t_{si})$, classifier 204 may be configured to calculate a statistic based semantic relatedness between each of the set of key terms and each of the set of common terms; to calculate a content based semantic relatedness, corresponding to the statistic based semantic relatedness, between each of the set of key terms and each of the set of common terms; to assign an adjustable weight factor to each one of the statistic based semantic relatedness and the content based semantic relatedness; and calculate the semantic relatedness value based on the statistic based semantic relatedness, the content based semantic relatedness, and the adjustable weight factor. Block 308 may be followed by block 310.

Decision block 310 (Semantic Relatedness Reaches Threshold?) may refer to classifier 204 determining whether the calculated semantic relatedness value reaches a predetermined threshold value. If yes, processing may continue from decision block 310 to block 312; if not, processing may continue from decision block 310 to block 314.

Block 312 (Disregard Received Questions) may refer to classifier 204 disregarding the respective question if the calculated semantic relatedness value is equal to or greater than the predetermined threshold value. Block 312 may be followed by block 316.

Block 314 (Recognize New Common Questions) may refer to classifier 204 recognizing the respective question as a new common question if the calculated semantic relatedness value is below the predetermined threshold value. Block 314 may be followed by block 316.

Block 316 (Sort Common Questions) may refer to sorter 208 sorting the common questions based on the one or more parameters. In at least one example, sorter 208 may be configured to sort the common questions based on a general semantic relatedness value between each of the common questions and a general topic of the group activity, e.g., a lecture. The general semantic relatedness value may indicate the relevancy of each common question to the general topic. The host or lecturer may then select those questions that are most relevant to answer first.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
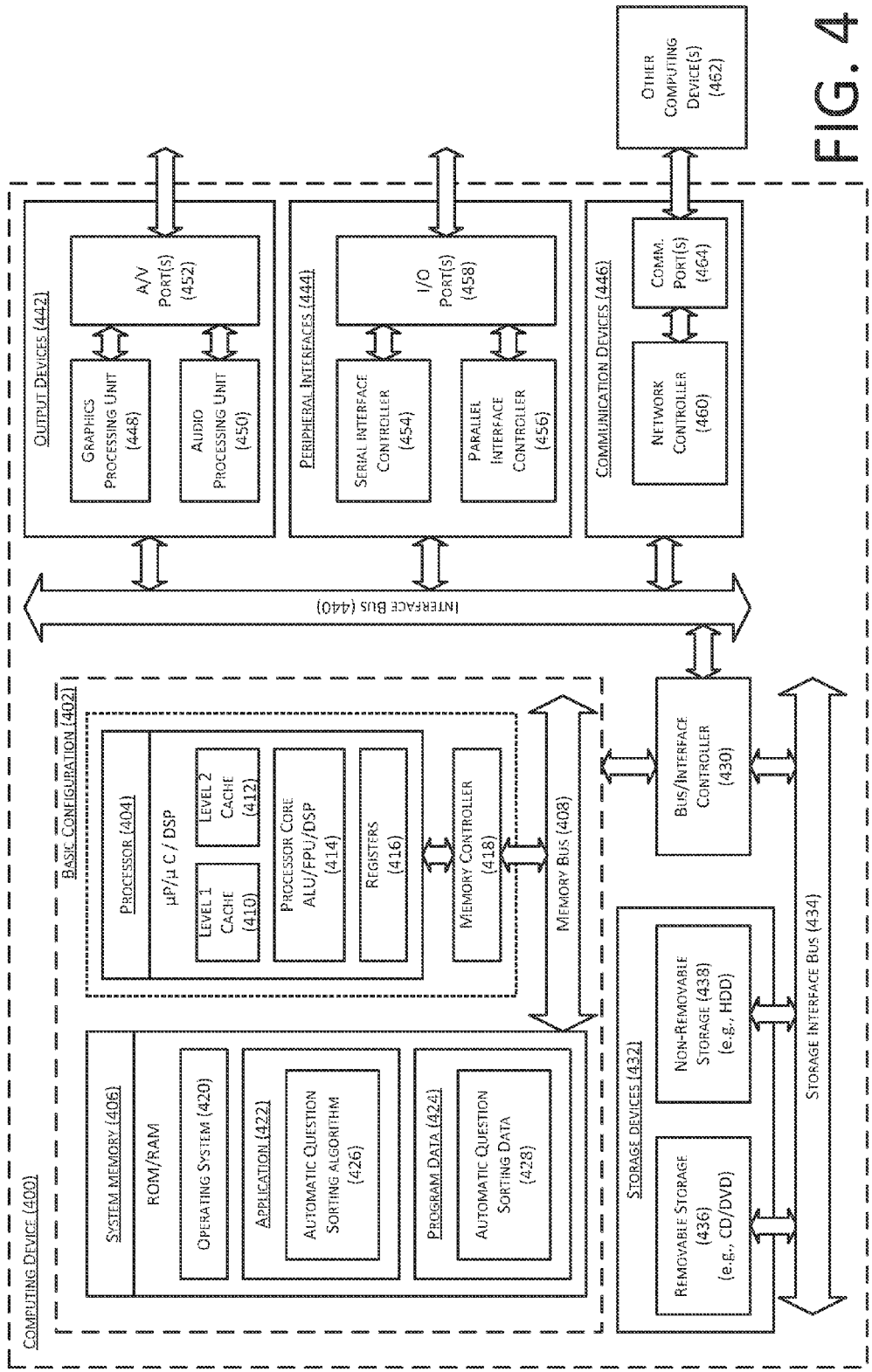
FIG. 4 shows a block diagram illustrating an example computing device that is arranged for automatic question sorting, all arranged in accordance with at least some embodiments described herein.

FIG. 4 shows a block diagram 400 illustrating an example computing device that is arranged for automatic question sorting, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an automatic question sorting algorithm 426 that is arranged to perform the functions as described herein including those described with respect to process 300. Program data 424 may include automatic question sorting data 428 that may be useful for operation with automatic question sorting algorithm 426 as is described herein. In some embodiments, application 422 may be arranged to operate with program data 424 on operating system 420 such that implementations of automatic question sorting may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably coupleable", to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to rank questions, comprising:
   electronically receiving, by a server from a plurality of electronic devices communicatively coupled to the server, a plurality of questions, wherein the plurality of electronic devices are associated with a plurality of participants of a group activity;
   classifying, by the server, the plurality of questions into a plurality of subsets of questions, wherein the plurality of subsets of questions are represented by a plurality of common questions, and wherein the classifying includes classifying the plurality of questions based on a semantic relatedness value between each of the plurality of common questions and each of remaining questions of the plurality of questions;
   sorting, by the server, the plurality of common questions based on one or more parameters of each of the plurality of common questions, wherein the one or more parameters include a semantic relatedness value between each of the plurality of common questions and a topic associated with the group activity; and
   presenting, by the server via an output device, the sorted plurality of common questions, thereby enabling a host of the group activity to efficiently select and answer the plurality of questions received from the plurality of participants.

2. The method of claim 1, wherein the classifying the plurality of questions comprises:
   identifying the plurality of common questions;
   calculating the semantic relatedness value between each of the remaining questions, of the plurality of questions, and each of the plurality of common questions;

determining whether any of the semantic relatedness values reaches a particular threshold value;

in response to determining that one or more of the semantic relatedness values are equal to or greater than the particular threshold value, disregarding one or more questions, of the remaining questions, wherein the one or more questions correspond to the one or more semantic relatedness values; and in response to determining that one or more other semantic relatedness values, of the semantic relatedness values between each of the remaining questions and each of the plurality of common questions, are not equal to or are less than the particular threshold value, identifying one or more other questions, of the remaining questions, as one or more new common questions, wherein the one or more other questions correspond to the one or more other semantic relatedness values.

3. The method of claim 2, wherein the calculating the semantic relatedness value between one of the remaining questions and one of the plurality of common questions comprises:

pretreating the one of the remaining questions;

extracting a set of new terms from the pretreated one of the remaining questions;

extracting a set of common terms from the one of the plurality of common questions; and calculating the semantic relatedness value between the set of new terms and the set of common terms.

4. The method of claim 3, wherein the calculating the semantic relatedness value between the set of new terms and the set of common terms comprises:

calculating a statistic based semantic relatedness between the set of new terms and the set of common terms;

calculating a content based semantic relatedness, which corresponds to the statistic based semantic relatedness, between each of the set of new terms and each of the set of common terms;

assigning an adjustable weight factor to each one of the statistic based semantic relatedness and the content based semantic relatedness; and calculating the semantic relatedness value between the set of new terms and the set of common terms based on the statistic based semantic relatedness, the content based semantic relatedness, and the adjustable weight factor.

5. The method of claim 4, wherein the calculating the statistic based semantic relatedness comprises:

retrieving a first set of search results of a first internet based search on a first term selected from the set of new terms;

retrieving a second set of search results of a second internet based search on a second term selected from the set of common terms;

retrieving a third set of search results of a third internet based search on the first term combined with the second term; and calculating the statistic based semantic relatedness based on respective counts of the first set of search results, the second set of search results, and the third set of search results.

6. The method of claim 5, wherein the calculating the content based semantic relatedness comprises:

generating respective content vectors for the first term and the second term based on a particular respective number of webpages selected from the first set of search results and the second set of search results; and calculating a cosine similarity, as the content based semantic relatedness, between the respective content vectors for the first term and the second term.

7. The method of claim 1, wherein the one or more parameters further include a popularity value, a time of submission, or a length of each of the plurality of common questions.

8. The method of claim 7, further comprising:

generating a common question list that includes the plurality of common questions and the one or more parameters that correspond to each of the plurality of common questions.

9. A system, comprising:

a question organizer configured to electronically receive, from a plurality of electronic devices communicatively coupled to the question organizer, a plurality of questions, wherein the plurality of electronic devices are associated with a plurality of participants of a group activity;

a classifier, communicatively coupled to the question organizer, and configured to classify the plurality of questions into a plurality of subsets of questions, wherein the plurality of subsets of questions are represented by a plurality of common questions, and wherein the classification includes classification of the plurality of questions based on a semantic relatedness value between each of the plurality of common questions and each of remaining questions of the plurality of questions;

a calculator configured to calculate one or more parameters of each of the plurality of common questions, wherein the one or more parameters include one or more of: a popularity value, a time of submission, a general semantic relatedness value between each of the plurality of common questions and a topic associated with the group activity, or a length of each of the plurality of common questions;

a sorter, communicatively coupled to the classifier and the calculator, and configured to sort the plurality of common questions based on the one or more parameters of each of the plurality of common questions; and a publisher, communicatively coupled to the sorter, and configured to publish, via an output device, a question list that includes the sorted plurality of common questions, so as to enable a host of the group activity to efficiently select and answer the plurality of questions received from the plurality of participants.

10. The system of claim 9, wherein, to classify the plurality of questions, the classifier is configured to:

identify the plurality of common questions;

calculate the semantic relatedness value between each of the remaining questions, of the plurality of questions, and each of the plurality of common questions;

determine whether any of the semantic relatedness values reaches a particular threshold value;

in response to a determination that one or more of the semantic relatedness values are equal to or greater than the particular threshold value, disregard one or more questions, of the remaining questions, wherein the one or more questions correspond to the one or more semantic relatedness values; and in response to a determination that one or more other semantic relatedness values, of the semantic relatedness values between each of the remaining questions and each of the plurality of common questions, are not equal to or are less than the particular threshold value, identify one or more other questions, of the remaining questions, as one or more new common questions, wherein the one or more other questions correspond to the one or more other semantic relatedness values.

11. The system of claim 10, wherein, to calculate the semantic relatedness value between one of the remaining questions and one of the plurality of common questions, the classifier is configured to:
the one of the remaining questions;
extract a set of new terms from the pretreated one of the remaining questions;
extract a set of common terms from the one of the plurality of common questions; and
calculate the semantic relatedness value between the set of new terms and the set of common terms.

12. The system of claim 11, wherein, to calculate the semantic relatedness value between the set of new terms and the set of common terms, the classifier is configured to:
calculate a statistic based semantic relatedness between the set of new terms and the set of common terms;
calculate a content based semantic relatedness, which corresponds to the statistic based semantic relatedness, between the set of new terms and the set of common terms;
assign an adjustable weight factor to each one of the statistic based semantic relatedness and the content based semantic relatedness; and
calculate the semantic relatedness value between the set of new terms and the set of common terms based on the statistic based semantic relatedness, the content based semantic relatedness, and the adjustable weight factor.

13. The system of claim 12, wherein, to calculate the statistic based semantic relatedness, the classifier is configured to:
retrieve a first set of search results of a first internet based search on a first term selected from the set of new terms;
retrieve a second set of search results of a second internet based search on a second term selected from the set of common terms;
retrieve a third set of search results of a third internet based search on the first term combined with the second term; and
calculate the statistic based semantic relatedness based on respective counts of the first set of search results, the second set of search results, and the third set of search results.

14. The system of claim 13, wherein, to calculate the content based semantic relatedness, the classifier is configured to:
generate respective content vectors for the first term and the second term based on a particular respective number of webpages selected from the first set of search results and the second set of search results; and
calculate a cosine similarity, as the content based semantic relatedness, between the respective content vectors for the first term and the second term.

15. A non-transitory computer-readable medium that stores executable-instructions that, in response to execution by one or more processors associated with a server, cause the one or more processors to perform or control performance of operations comprising:
electronically obtaining, from a plurality of electronic devices communicatively coupled to the server, a plurality of questions, wherein the plurality of electronic devices are associated with a plurality of participants of a group activity;
classifying, by the server, the plurality of questions into a plurality of subsets of questions, wherein the plurality of subsets of questions are represented by a plurality of common questions, and wherein the classifying includes classifying the plurality of questions based on a semantic relatedness value between each of the plurality of common questions and each of remaining questions of the plurality of questions;
receiving a new question;
calculating a respective semantic relatedness value between the new question and each of the plurality of common questions;
determining whether at least one of the respective semantic relatedness values reaches a particular threshold value;
including the new question in a subset of questions, of the plurality of subsets of questions, wherein the subset of questions is represented by a common question, of the plurality of common questions, having the semantic relatedness value corresponding to the new question equal to or greater than the particular threshold value;
identifying the new question as a new common question if none of the respective semantic relatedness values is equal to or greater than the particular threshold value;
sorting the plurality of common questions based on one or more parameters, which include at least one of a popularity value, a time of submission, a general semantic relatedness value between each of the plurality of common questions and a topic associated with the group activity, or a length of each of the plurality of common questions; and
publishing, via an output device, a common question list that includes the sorted plurality of common questions and the one or more parameters that correspond to each of the plurality of common questions, thereby enabling a host of the group activity to efficiently select and answer the plurality of questions received from the plurality of participants.

16. The non-transitory computer-readable medium of claim 15, wherein the calculating the respective semantic relatedness value comprises:
pretreating the new question;
extracting a set of new terms from the pretreated new question;
extracting a respective set of common terms from each of the plurality of common questions; and
calculating the respective semantic relatedness value between the set of new terms and each of the respective set of common terms.

17. The non-transitory computer-readable medium of claim 16, wherein the calculating the respective semantic relatedness value between the set of new terms and each of the respective set of common terms comprises:
calculating a respective statistic based semantic relatedness between each of the set of new terms and each of the respective set of common terms;
calculating a respective content based semantic relatedness, which corresponds to the statistic based semantic relatedness, between each of the set of new terms and each of the respective set of common terms;
assigning an adjustable weight factor to each one of the respective statistic based semantic relatedness and the respective content based semantic relatedness; and
calculating the respective semantic relatedness value based on the respective statistic based semantic relatedness, the respective content based semantic relatedness, and the adjustable weight factor.

18. The non-transitory computer-readable medium of claim 17, wherein, for each of the respective set of common terms, calculating the respective statistic based semantic relatedness comprises:
- retrieving a first set of search results of a first internet based search on a first term selected from the set of new terms;
- retrieving a second set of search results of a second internet based search on a second term selected from the set of common terms;
- retrieving a third set of search results of a third internet based search on the first term combined with the second term; and
- calculating the respective statistic based semantic relatedness based on respective counts of the first set of search results, the second set of search results, and the third set of search results.

19. The non-transitory computer-readable medium of claim 18, wherein for each of the respective set of common terms, calculating the respective content based semantic relatedness comprises:
- generating respective content vectors for the first term and the second term based on a particular respective number of webpages selected from the first set of search results and the second set of search results; and
- calculating a cosine similarity, as the respective content based semantic relatedness, between the respective content vectors for the first term and the second term.

* * * * *